United States Patent
Han et al.

(10) Patent No.: US 9,058,422 B2
(45) Date of Patent: Jun. 16, 2015

(54) POLLING DETERMINATION

(71) Applicant: INTEL CORPORATION, Santa Clara, CA (US)

(72) Inventors: Kyungtae Han, Portland, OR (US); Paul Diefenbaugh, Portland, OR (US); Sarah Sharp, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/040,649

(22) Filed: Sep. 28, 2013

(65) Prior Publication Data

US 2015/0095524 A1    Apr. 2, 2015

(51) Int. Cl.
  G06F 13/28    (2006.01)
  G06F 13/366    (2006.01)
  G06F 13/34    (2006.01)

(52) U.S. Cl.
  CPC .............. G06F 13/366 (2013.01); G06F 13/34 (2013.01)

(58) Field of Classification Search
  USPC .......................................................... 710/26
  See application file for complete search history.

(56) References Cited

U.S. PATENT DOCUMENTS

| | | | |
|---|---|---|---|
| 6,640,268 B1 * | 10/2003 | Kumar ............................. | 710/46 |
| 6,718,412 B2 * | 4/2004 | Purcell et al. .................. | 710/109 |
| 7,184,753 B2 * | 2/2007 | Huynh ........................ | 455/412.1 |

* cited by examiner

*Primary Examiner* — Chun-Kuan Lee
(74) *Attorney, Agent, or Firm* — International IP Law Group, PLLC

(57) ABSTRACT

Techniques for polling an input/output (I/O) device are described herein. The techniques include polling a device for data from the I/O device, and receiving the data from the I/O device at the host device as a result of the polling. The techniques include determining whether the data received is the same as data received at a previous polling of the I/O device. Upon determining the data received is the same, the techniques include decreasing the polling rate if the data is the same, and if it is not the same. Upon determining the data is not the same, the techniques include increasing the polling rate if the data is not the same.

27 Claims, 4 Drawing Sheets

POLLING DETERMINATION

TECHNICAL FIELD

This disclosure relates generally to techniques for polling an input/output (I/O) device. More specifically, the disclosure describes techniques for increasing or decreasing the polling rate based on data received.

BACKGROUND

Computing devices are equipped with an increasing number of user interactive applications. For example, mobile computing devices, such as smartphones and tablets, are configured to run user interactive applications which demand fast responsiveness and low power consumption. In some cases, interactive applications are implemented by interfaces such as Universal Serial Bus (USB). Interfaces, such as USB, may provide challenges to achieve low latency and low power during communication via the interface between an input device and a host computing device.

DETAILED DESCRIPTION

The subject matter disclosed herein relates to techniques for polling an input/output (I/O) device. A host computing device may receive data from the I/O device. Initially, a polling rate may be set by a host computing device based on a specific implementation to receive data from the I/O device at a polling interval. For example, in a Universal Serial Bus, the polling rate may be 125 Hz, or polling once every 8 milliseconds. However, at each polling interval, the I/O device may provide unchanged data to the host computing device. In the case of the I/O device providing unchanged data, the polling rate may be decreased. For example, the polling rate may be decreased to 62.5 Hz, or polling once every 16 milliseconds. The adaptive polling may enable a host device to decrease power consumption and increase responsiveness of the host device to the I/O device input.

An "I/O device," as referred to herein, is an I/O device having a defined polling rate. In embodiments, the I/O device may be an interrupt I/O device. An interrupt I/O device is a device defined by a driver in the host computing device, wherein the device driver will cause an interrupt to occur whenever the polling takes place.

Figure 1:
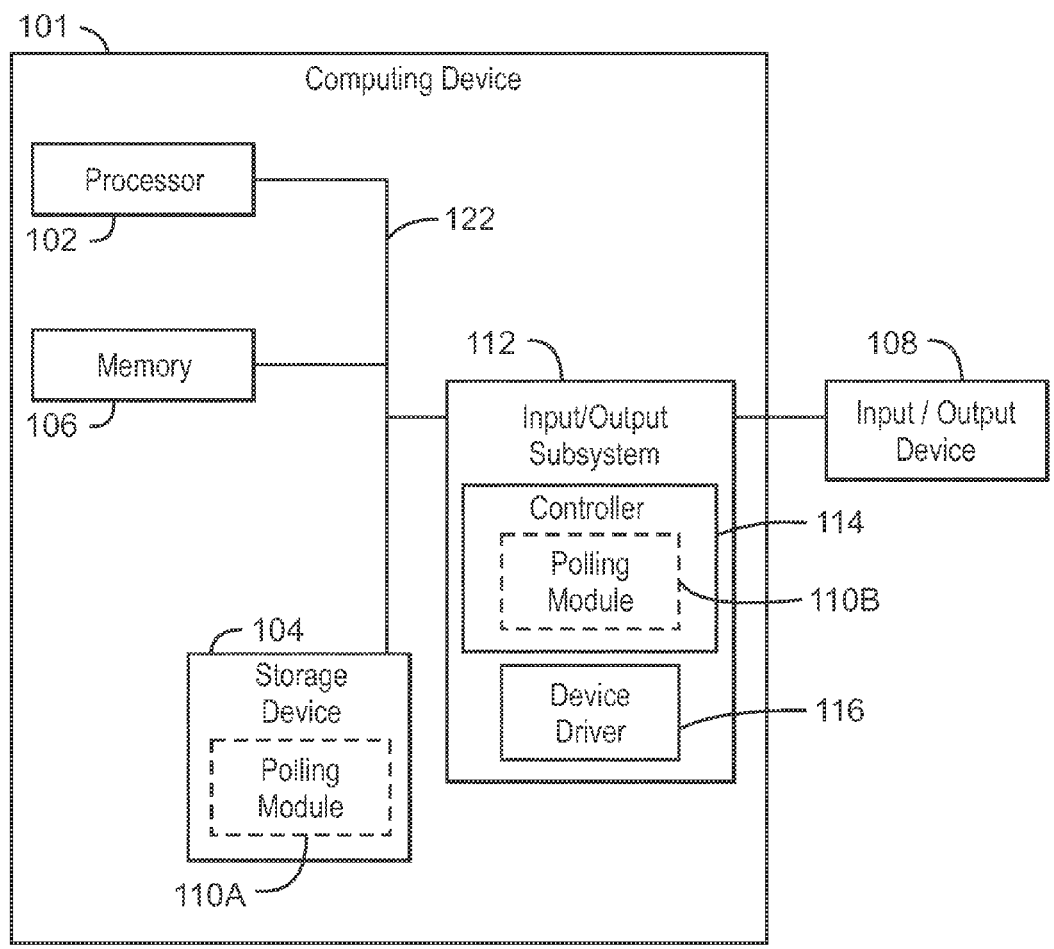
FIG. 1 is a block diagram of a computing system configured to poll an input/output device.

FIG. 1 is a block diagram of a computing system configured to poll an input/output device. The computing system 100 may include a computing device 101 having a processor 102, a storage device 104 comprising a non-transitory computer-readable medium, and a memory device 106. The computing device 101 may be a host computing device configured to receive input from an input/output (I/O) device 108. The I/O device 108 may be a human input device (HID) such as a mouse, a keyboard, and the like.

In embodiments, techniques described herein for polling an I/O device may be implemented in an input/output (I/O) protocol such as Universal Serial Bus (USB), peripheral component interconnect express (PCIe), DisplayPort, and the like. The techniques described herein may also be implemented in any suitable future I/O protocol, including a unified I/O protocol.

The storage device 104 may include a polling module 110A. The polling module 110 may be a set of instructions stored on the storage device 104. The instructions, when executed by the processor 102, direct the computing device 101 to perform operations including polling a device, such as the I/O device 108 for data from the I/O device and receiving the data from the I/O device 108 at the host computing device 101 as a result of the polling. The instructions may direct the computing device 101 to determine whether the data received is the same as data received at a previous polling of the I/O device 108. The instructions may direct the computing device 101 to decrease the polling rate if the data is the same, and if it is not the same; increase the polling rate.

In embodiments, the polling module may be implemented as logic, at least partially including hardware logic, and indicated by the dashed box 110B as opposed to instructions carried out by the processor 102 as indicated by the dashed box 110A. In embodiments, the polling module, either 110A or 110B, may be implemented as a combination of hardware, software, or firmware. As illustrated in FIG. 1, the polling module 110B may be implemented within a I/O device subsystem 112 including controller 114, such as a USB controller configured to implement the polling module 110B as logic, at least partially including hardware logic, as software, firmware, or any combination thereof. The I/O subsystem 112 may include a device driver 116 configured to interface with the I/O device 108 and the computing device 101.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The main processor 102 may be connected through a system bus 122 (e.g., PCI, ISA, PCI-Express, HyperTransport®, NuBus, etc.) to components including the memory 106, the storage device 110, and the I/O subsystem 112.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
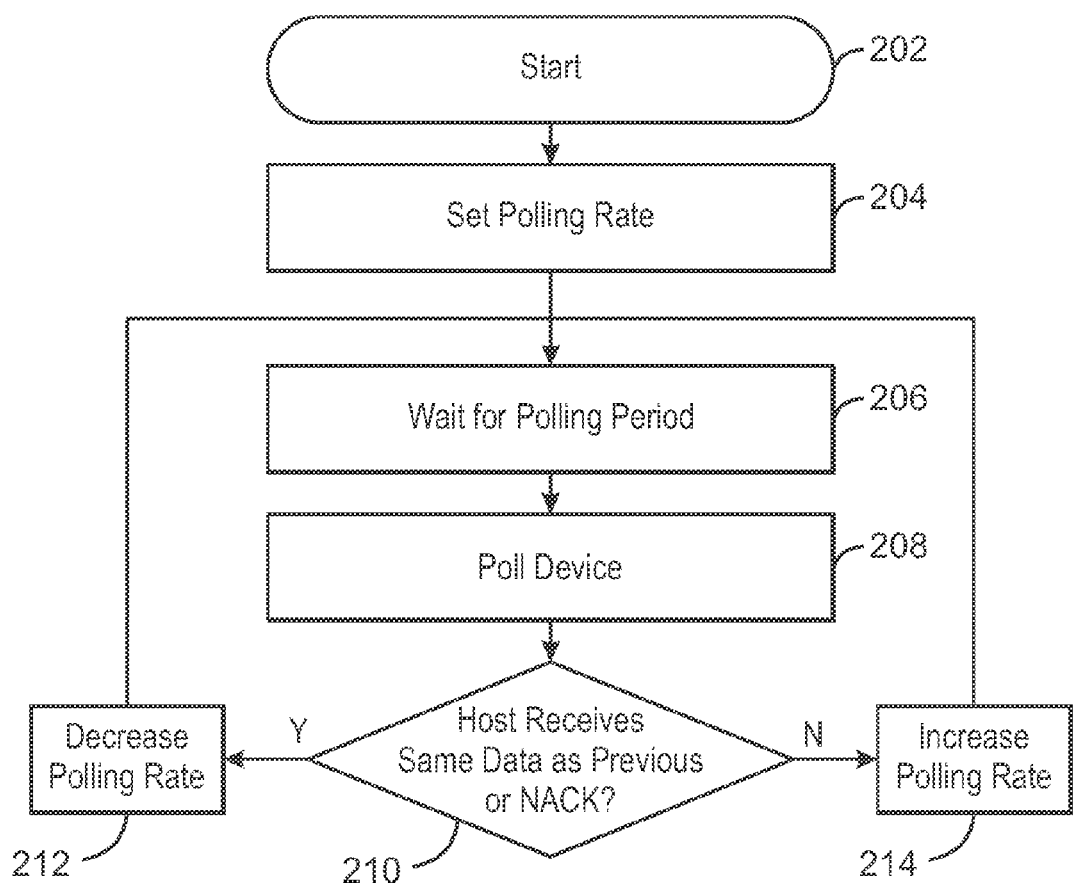
FIG. 2 is a block diagram illustrating a method for polling an I/O device by a host computing device.

FIG. 2 is a block diagram illustrating a method for polling an I/O device by a host computing device. At block 202, a polling process is initiated. At block 204, the polling rate is set or fixed based on a specific implementation. For example, the polling rate may be 16 milliseconds, wherein the I/O device may be polled every 16 milliseconds. At block 206, the host device may wait for the set polling rate. At block 208, the device may be polled. Upon polling, the I/O device may provide data to the host computing device. For example, if the I/O device is a mouse, the mouse may provide the host computing device with coordinates indicating a position of mouse. At block 210, a determination may be made to whether the received data is the same as data received at a previous polling interval. In some embodiments, the I/O device may provide a "no acknowledgement" signal (NACK) to the host device indicating that there has been no change in the data. At block 212, if the received data is the same as was received in a previous poll interval, then the polling rate may be decreased. At block 214, if the received data is not the same, then the polling rate may be increased.

An example of the method 200 may include an I/O device such as a mouse. The mouse may be polled at 125 Hz (once every 8 milliseconds) as determined by a configuration, such as a USB specification. The computing device may poll the data every 8 milliseconds to receive data from the mouse. Typically, the mouse will provide coordinates to the computing device. If the coordinates provided are the same during subsequent polls of the mouse, then the mouse is not changing position, and the polling rate can be decreased to 62.5 Hz (once per every 16 milliseconds), for example. If the coordinates are not the same during subsequent polls, then the mouse is changing position, and the pooling rate can be increased from 125 Hz (once every 8 milliseconds) to 1 KHz (once every 1 millisecond). The techniques reduce the potential for unnecessary polling when the I/O device, such as a mouse, provides the same data to the computing device, and increases responsiveness when the device is providing different data.

In embodiments, the determination to change a polling rate may be based on a plurality of previously received data. For example, the I/O device data may be sampled a plurality of times previous to a sampling a current sample. The polling rate may be changed when the data received in the current sample is different from the average data received during the plurality of times previous to the current sample.

In embodiments, the determination to change a polling rate may be weighted. For example, given a previous sample, the polling rate may be changed only when the difference between the received data is above a predetermined threshold. The threshold may be predetermined by an operator, for example, or an application running on the host computing device.

Figures 3A, 3B, 3C:
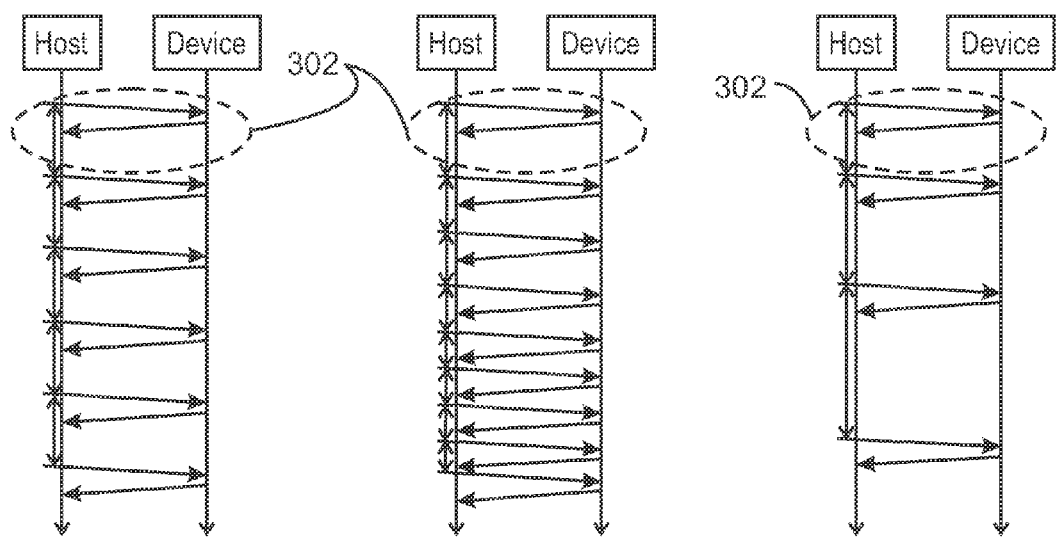
FIGS. 3A-3C are diagrams illustrating polling rates adapted based on data received.

FIGS. 3A-3C are diagrams illustrating polling rates adapted based on data received. As illustrated in FIGS. 3A-3C, the host may communicate with an I/O device, as indicated by the dashed circles 302. FIG. 3A illustrates a rate at which the device is polled is set, for example, according to a specific implementation such as a USB specification. FIG. 3B illustrates a rate that has increased in comparison to FIG. 3A. As discussed above, the rate of polling may be increased upon a determination that the data received from the I/O device is not the same as previous data. FIG. 3C illustrates a rate that has decreased in comparison to FIG. 3A, upon a determination that the data received is the same as the data previously received from the I/O device.

Figure 4:
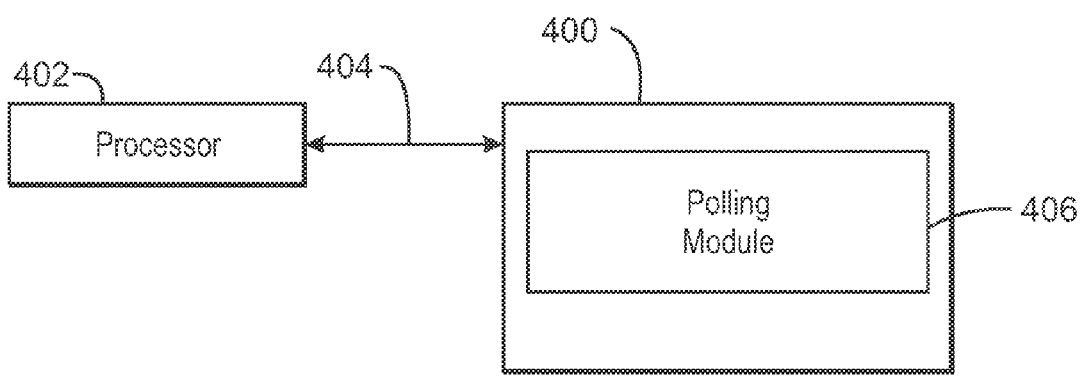
FIG. 4 is a block diagram depicting an example of a tangible, non-transitory computer-readable medium configured to modify polling rates for an input/output device.

FIG. 4 is a block diagram depicting an example of a tangible, non-transitory computer-readable medium configured to modify polling rates for an input/output device. The tangible, non-transitory, computer-readable medium 400 may be accessed by a processor 402 over a computer bus 404. Furthermore, the tangible, non-transitory, computer-readable medium 400 may include computer-executable instructions to direct the processor 402 to perform the steps of the current method.

The various software components discussed herein may be stored on the tangible, non-transitory, computer-readable medium 400, as indicated in FIG. 4. For example, a polling module 406 may be configured to adaptively change the polling rate based on the data received from an input/output (I/O) device. When the data received from polling the I/O device remains the same from one polling interval to the next, the polling rate may be decreased. Likewise, when the data received from polling the I/O device is not the same from one polling interval to the next, the polling rate may be increased. The adaptive polling may enable a reduction in power consumption of a host computing device, and may increase responsiveness of the computing device to the I/O device.

EXAMPLE 1

A method for determining a polling rate for an input/output (I/O) device communicatively coupled to a host device is described herein. The method includes polling a device, such as an I/O device for data. The polling may be performed at a host computing device. The host computing device receives the data from the I/O device as a result of the polling. The method includes determining whether the data received is the same as data received at a previous polling of the I/O device. The method may decrease the polling rate if the data is the same. If it is not the same, the method may include increasing the polling rate if the data is not the same.

EXAMPLE 2

A system for determining a polling rate for an input/output (I/O) device communicatively coupled to a host device is described herein. The system may include a means for processing, such as a processing device. The processing device may include a processing device to receive data from an I/O device. The system may include a memory means, such as a system memory device, wherein the system memory comprises code to direct the processing device to poll the I/O device for data from the I/O device. The code may direct the processing device to receive the data from the I/O device at the host device as a result of the polling. The code may direct the processing device to determine whether the data received is the same as data received at a previous polling of the I/O device. If the data is the same, the polling rate may be decreased. If the polling rage is not the same, the polling rate may be increased.

EXAMPLE 3

A tangible computer-readable medium comprising instructions to direct a processor to carry out operations is described herein. The operations include polling an input/output (I/O) device for data from the I/O device. The data may be received from the I/O device at a host device as a result of the polling. The operations include determining whether the data received is the same as data received at a previous polling of the I/O device. The operations also include decreasing the polling rate if the data is the same; and, increasing the polling rate if the data is not the same.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for determining a polling rate for an input/output (I/O) device communicatively coupled to a host device, the method comprising:
   polling the I/O device for data from the I/O device;
   receiving the data from the I/O device at the host device as a result of the polling;
   determining whether the data received is the same as data received at a previous polling of the I/O device, wherein determining whether the data is the same as data received at a previous polling comprises:
      sampling the data a plurality of times previous to a current sample; and
      determining whether the data received in the current sample is different from the average data received during the plurality of times;
   decreasing the polling rate if the data is the same; and, if it is not the same, increasing the polling rate.

2. The method of claim 1, wherein the I/O device is an I/O device having an interrupt endpoint, wherein a polling rate is predetermined by the host device, and the predetermined polling rate is changed based on the decreasing or increasing of the polling rate.

3. The method of claim 2, wherein the I/O device is an Universal Serial Bus device having an interrupt endpoint protocol.

4. The method of claim 2, wherein the I/O device is a unified I/O device.

5. The method of claim 1, wherein the polling rate is increased only if the difference between the current sample and the average data received during the plurality of times is above a threshold.

6. The method of claim 1, wherein a rate of change is the time required to change the polling rate, the method comprising:
   increasing the rate of change when the polling rate is to be increased; or
   decreasing the rate of change when the polling rate is to be decreased.

7. The method of claim 1, wherein the data comprises coordinates indicating a position of a mouse, the method further comprising sending a no acknowledgement (NACK) signal to the host device when the position of the mouse is unchanged.

8. A system for determining a polling rate for an input/output (I/O) device communicatively coupled to a host device, the system comprising:
   a processing device;
   a system memory, wherein the system memory comprises code to direct the processing device to:
      poll the I/O device for data from the I/O device;
      receive the data from the I/O device at the host device as a result of the polling;
      determine whether the data received is the same as data received at a previous polling of the I/O device, wherein to determining whether the data is the same as data received at a previous polling comprises:
         sampling the data a plurality of times previous to a current sample; and
         determining whether the data received in the current sample is different from the average data received during the plurality of times;
      decrease the polling rate if the data is the same; and, if it is not the same, increase the polling rate.

9. The system of claim 8, wherein the I/O device is an I/O device having an interrupt endpoint, wherein a polling rate is predetermined by the host device, and the predetermined polling rate is changed based on the decreasing or increasing of the polling rate.

10. The system of claim 9, wherein the I/O device is an Universal Serial Bus (USB) device having an interrupt endpoint protocol.

11. The system of claim 9, wherein the I/O device is a unified I/O device.

12. The system of claim 8, wherein the polling rate is increased only if the difference between the current sample and the average data received during the plurality of times is above a threshold.

13. The system of claim 8, wherein a rate of change is the time required to change the polling rate, comprising code to direct the processing device to:
increase the rate of change when the polling rate is to be increased; or
decrease the rate of change when the polling rate is to be decreased.

14. The system of claim 8, wherein the data comprises coordinates indicating a position of a mouse, wherein the operations comprise sending a no acknowledgement (NACK) signal to the host device when the position of the mouse is unchanged.

15. A non-transitory tangible computer-readable medium comprising instructions to direct a processor to carry out operations, the operations comprising:
polling an input/output (I/O) device for data from the I/O device;
receiving the data from the I/O device at a host device as a result of the polling;
determining whether the data received is the same as data received at a previous polling of the I/O device, wherein determining whether the data is the same as data received at a previous polling comprises:
sampling the data a plurality of times previous to a current sample; and
determining whether the data received in the current sample is different from the average data received during the plurality of times;
decreasing the polling rate if the data is the same; and, if it is not the same, increasing the polling rate.

16. The non-transitory tangible computer-readable medium of claim 15, wherein the I/O device is an I/O device having an interrupt endpoint, wherein a polling rate is predetermined by the host device, and the predetermined polling rate is changed based on the decreasing or increasing of the polling rate.

17. The non-transitory tangible computer-readable medium of claim 16, wherein the I/O device comprises:
a Universal Serial Bus device having an interrupt endpoint protocol;
is a unified I/O device; or
any combination of the above.

18. The non-transitory tangible computer-readable medium of claim 15, wherein the polling rate is increased only if the difference between the current sample and the average data received during the plurality of times is above a threshold.

19. The non-transitory tangible computer-readable medium of claim 15, wherein a rate of change is the time required to change the polling rate, the method comprising:
increasing the rate of change when the polling rate is to be increased; or
decreasing the rate of change when the polling rate is to be decreased.

20. The non-transitory tangible computer-readable medium of claim 15, wherein the data comprises coordinates indicating a position of a mouse, wherein the code is to direct the processing device to send a no acknowledgement (NACK) signal to the host device when the position of the mouse is unchanged.

21. An apparatus for determining a polling rate for an input/output (I/O) device communicatively coupled to a host device, comprising:
a controller, at least partially comprising hardware, of an I/O device interface;
logic, at least partially comprising hardware logic, the logic configured to:
poll the I/O device for data from the I/O device;
receive the data from the I/O device at the host device as a result of the polling;
determine whether the data received is the same as data received at a previous polling of the I/O device, wherein determining whether the data is the same as data received at a previous polling comprises:
sampling the data a plurality of times previous to a current sample; and
determining whether the data received in the current sample is different from the average data received during the plurality of times;
decrease the polling rate if the data is the same; and, if it is not the same,
increase the polling rate.

22. The apparatus of claim 21, wherein the I/O device is an I/O device having an interrupt endpoint, wherein a polling rate is predetermined by the host device, and the predetermined polling rate is changed based on the decreasing or increasing of the polling rate.

23. The apparatus of claim 22, wherein the I/O device is an Universal Serial Bus (USB) device having an interrupt endpoint protocol.

24. The apparatus of claim 22, wherein the I/O device is a unified I/O device.

25. The apparatus of claim 21, wherein the polling rate is increased only if the difference between the current sample and the average data received during the plurality of times is above a threshold.

26. The apparatus of claim 21, wherein a rate of change is the time required to change the polling rate, wherein the logic is to:
increase the rate of change when the polling rate is to be increased; or
decrease the rate of change when the polling rate is to be decreased.

27. The apparatus of claim 21, wherein the data comprises coordinates indicating a position of a mouse, wherein the logic is to sending a no acknowledgement (NACK) signal to the host device when the position of the mouse is unchanged.

* * * * *